Patented Sept. 18, 1923.

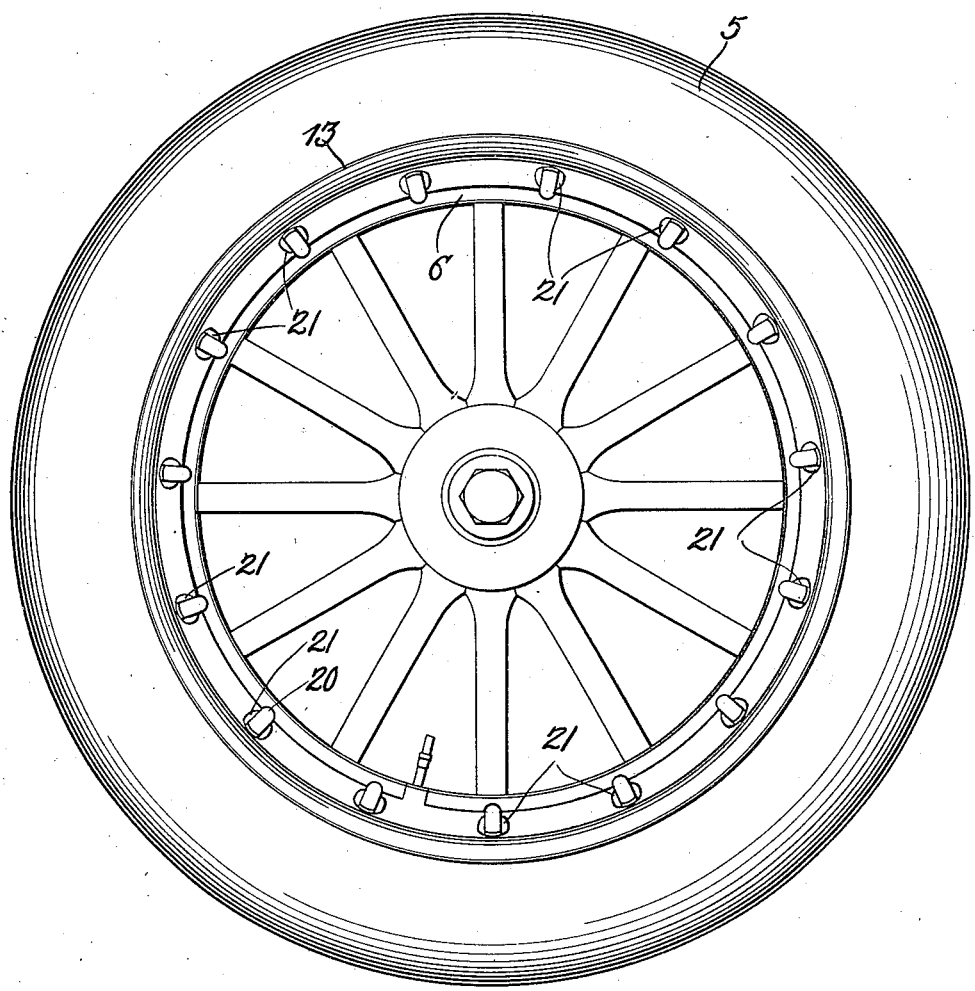

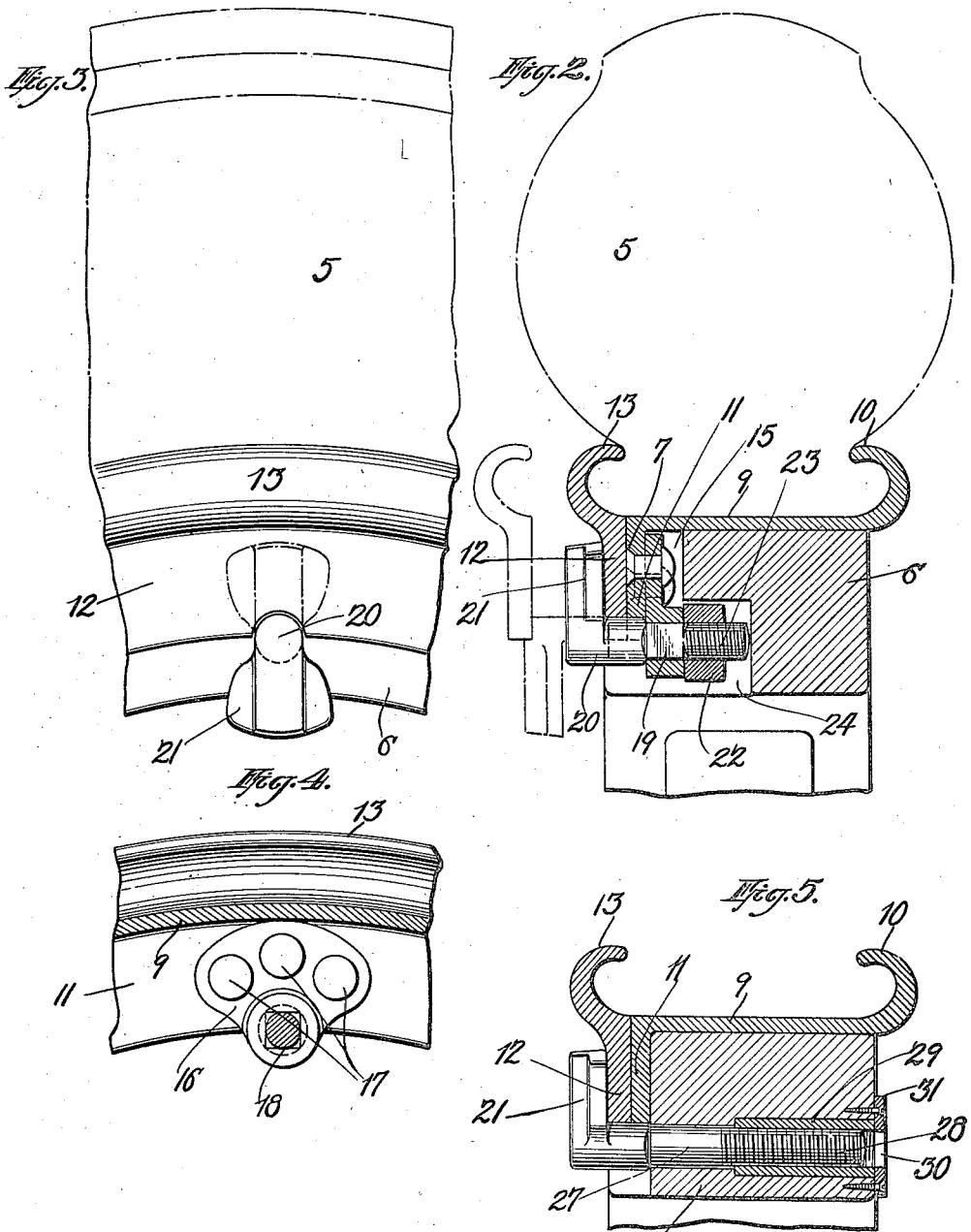

1,468,443

UNITED STATES PATENT OFFICE.

CHARLES ESMARIAN, OF PATERSON, NEW JERSEY.

DEMOUNTABLE RIM.

Application filed February 8, 1922. Serial No. 535,011.

*To all whom it may concern:*

Be it known that I, CHARLES ESMARIAN, a citizen of the United States, residing at Paterson, in the county of Passaic and State of New Jersey, have invented certain new and useful Improvements in Demountable Rims, of which the following is a specification.

This invention relates to demountable rims for vehicle tires and has for its primary object to provide a combination rim designed to hold either the clincher or straight sided type tire and to permit removal thereof with facility and ease when occasion demands without detaching the fastening bolts.

Another object of the invention is the construction of a demountable, combination rim consisting of two parts disposed circumferentially of the tire and having a radial flange to be held by a plurality of fastening and locking bolts so designed as to obviate their removal when one of the sections is separated in removing a tire.

Another and very important object of the invention is the provision of a novel and improved locking bolt which is adapted in one of its positions to be moved outwardly of one of the sections of the rim so as to be disengaged from its locked position, and rotated so that one of the sections of the rim may be removed.

Another and continued object of the invention is the construction of a demountable rim of the class above set forth which is extremely simple in construction, highly efficient in operation and use, strong and durable, consisting of a minimum number of parts and otherwise capable of being manufactured at an extremely low cost whereby its commercial possibilities are greatly enhanced.

I attain the above objects and others in the accompanying drawings, showing a preferred form of the invention, wherein, Figure 1 is a view in side elevation of a vehicle wheel embodying my improvement.

Figure 2 is a sectional view showing the combination rim and one of the locking bolts.

Figure 3 is a side view showing the different positions of the locking bolt.

Figure 4 is a view taken from the opposite side of the bolt shown by Figure 3 and Figure 5 is a sectional view of the rim showing one of the locking bolts as extending through the felly.

Referring now to the drawings, wherein like reference characters designate corresponding parts throughout the several views, 5 designates the usual type of clincher tire and 6 the felly of a vehicle wheel having its outer face cut away as at 24 about the outer periphery of the felly to a point adjacent the inner periphery so as to define a shoulder on which the rim may rest.

The rim itself consists of a main section 9 having its outer edge 10 bent in the form of a curve so as to engage the bead of the usual clincher type tire while the opposite edge 11 extends vertically and circumferentially of the rim and is designed to abut the vertical flange 12 of the complementary outer section of the rim which is similarly formed with a curved portion 13 to engage the tire proper.

Referring in particular to Figure 2, it will be observed that the felly is partly cut away as at 15 and attached to the inner side of the flange 11 of the rim section 9, I have provided a substantially triangular attaching plate 16, in the form of an ear and secured thereto by rivets 17 or other fastening elements as shown. The bottom portion of the triangular plate 16 is preferably provided with a squared opening 18 which forms a locking means for the square portion 19 of my novel and improved lock bolt, the shank 20 of which extends through suitable semi-circular recesses formed in the bottom of the vertical flanges 11 and 12 of the rim sections. The outer end of the lock bolt is preferably formed with an enlarged head 21 which abuts and locks the outer section of the rim when the nut 22 on the threaded end 23 of the lock bolt is tightened, it being observed that the nut and threaded end of the lock bolt are seated within the recess or cut out portion 24 of the felly somewhat removed from the outer periphery thereof.

In addition to the above locking means, the respective sections of the rim are secured by a plurality of additional elongated lock bolts 27, the threaded ends 28 of which are disposed within the threaded sleeves 29 extending through suitable apertures 30 within the felly. A washer 31 may be applied to the base of the felly over the end of the sleeve if desired to prevent dislodgement of the latter to form a neat finish.

It will be thus observed that my novel and improved locking feature for the sections of the demountable rim are such that the same may be maintained on the felly at all times while the outer section of the rim is removed when replacing a tire and thus prevent the loss of the locking element which has been found to be an objectionable feature in many types of sectional rims. In other words, by loosening the nut 22, the square portion 19 of the shank 20 may be moved outwardly of the fastening plate 16 so that the head 21 of the lock bolt may be moved to the dotted line position shown by Figure 3 so that the section of the rim may be removed.

In the accompanying drawings, I have illustrated my invention embodied in one form by way of example, and which construction has been found to answer to a satisfactory degree the results to be obtained. It would be manifest however, that other forms of embodiment may be adopted, and that the construction may be variously changed and modified by the skilled mechanic without departing from the limits of the invention. Further it will be understood that the invention is not limited to any particular form of construction in the parts, except in so far as such limitations are specified in the subject matter being claimed.

Having thus described my invention, what I claim as new, and desire to secure by United States Letters Patent is:—

1. A wheel rim comprising two sections, flanges formed on the respective sections, substantially triangular attaching plates secured to the inner face of one of the sections, said plates having squared sleeves, lock bolts held by the squared sleeve portions of the plate for securing the respective sections together, said lock bolts being movable outwardly thereof to permit one of the sections to be removed.

2. A wheel rim comprising two sections, flanges formed on the respective sections, substantially triangular attaching plates riveted to the inner face of one of the sections, each of said plates having a squared sleeve portion in the bottom thereof, a locking bolt for each squared shank portion of the plates, said locking bolt having squared shank and enlarged head for securing the said sections of the rim together and adapted to be moved outwardly thereof to permit of the separation of the sections without removing the bolts.

3. A wheel rim comprising two sections, flanges formed on the respective sections, attaching plates secured to the inner face of one of the sections, each of said plates having a sleeve, a lock bolt cooperating with each sleeve for securing the respective sections together, said bolts being movable outwardly to allow one of the sections to be removed from the other.

In testimony whereof I affix my signature in presence of two witnesses.

CHARLES ESMARIAN. [L. S.]

Witnesses:
 JAMES TOMAI,
 JAMES DUNPHY.